(12) United States Patent
Dong et al.

(10) Patent No.: US 9,740,051 B2
(45) Date of Patent: Aug. 22, 2017

(54) DISPLAY SUBSTRATE AND MANUFACTURING METHOD THEREOF, LIQUID CRYSTAL CELL AS WELL AS DISPLAY

(71) Applicants: Boe Technology Group Co., Ltd., Beijing (CN); Beijing Boe Optoelectroics Technology Co., Ltd., Beijing (CN)

(72) Inventors: Tingze Dong, Beijing (CN); Xuejiao Huang, Beijing (CN); Xing Qin, Beijing (CN); Zhinan Zhang, Beijing (CN); Xiuliang Wang, Beijing (CN)

(73) Assignees: BEIJING BOE TECHNOLOGY CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/217,418

(22) Filed: Jul. 22, 2016

(65) Prior Publication Data
US 2017/0199436 A1    Jul. 13, 2017

(30) Foreign Application Priority Data

Jan. 7, 2016 (CN) .......................... 2016 1 0008826

(51) Int. Cl.
*G02F 1/1337* (2006.01)
*G02F 1/1341* (2006.01)

(52) U.S. Cl.
CPC ...... *G02F 1/133788* (2013.01); *G02F 1/1341* (2013.01); *G02F 1/133784* (2013.01); *G02F 2001/13415* (2013.01)

(58) Field of Classification Search
CPC ......... G02F 1/133784; G02F 1/133514; G02F 1/134309; G02F 1/136286
See application file for complete search history.

(56) References Cited

U.S. PATENT DOCUMENTS

| | | | |
|---|---|---|---|
| 2008/0291370 A1* | 11/2008 | Kurosawa | G02F 1/133711 349/96 |
| 2009/0059149 A1* | 3/2009 | Maeda | G02F 1/133784 349/126 |
| 2013/0293813 A1* | 11/2013 | Kusafuka | G02F 1/133512 349/111 |
| 2013/0300990 A1* | 11/2013 | Kusafuka | G02F 1/133512 349/111 |
| 2015/0085236 A1* | 3/2015 | Kanehiro | G02F 1/133719 349/124 |
| 2016/0306235 A1* | 10/2016 | Dong | G02F 1/133514 |

* cited by examiner

*Primary Examiner* — Joseph L Williams
(74) *Attorney, Agent, or Firm* — Calfee, Halter & Griswold LLP

(57) ABSTRACT

The present application discloses a method for manufacturing a display substrate. The method comprises: coating all regions of a base substrate with an alignment film; performing a rubbing process on the base substrate coated with the alignment film; and removing the alignment film outside a display region of the base substrate by a photolithography process so as to retain only the alignment film in the display region. The present application further discloses a display substrate manufactured by such a manufacturing method, as well as a liquid crystal cell and a display comprising such a display substrate.

16 Claims, 5 Drawing Sheets

DISPLAY SUBSTRATE AND MANUFACTURING METHOD THEREOF, LIQUID CRYSTAL CELL AS WELL AS DISPLAY

CROSS REFERENCE TO RELATED APPLICATIONS

The present application claims the benefit of Chinese patent application No. 201610008826.1 filed on Jan. 7, 2016, which is incorporated by reference in its entirety herein.

FIELD

The present application relates to the technical field of display, and specifically to a display substrate and a manufacturing method thereof, a liquid crystal cell as well as a display.

BACKGROUND ART

Rubbing Ghost Mura is a very serious quality problem in the existing process for a thin film transistor (TFT). It not only severely influences the image quality of products and the yield thereof, but also results in a low detection rate for inferior products, which easily gives rise to missed detection and causes huge waste of resources and materials in the back end accompanied by serious quality problems. The root cause for the problem of poor quality can be construed as follows. Since edges of a glass substrate have binding lines, during a rubbing process, when the rubbing proceeds to a connection position, friction cloth will generate an electrostatic difference as it contacts different surface mediums (including ITO, PVX and alignment film), and thus the fabric direction or the like of the cloth will be changed. In this case, unfavorable alignment abnormality will occur at the end of the rubbing, which is called Ghost Mura.

SUMMARY

Embodiments of the present application provide a display substrate and a manufacturing method thereof, a liquid crystal cell as well as a display, so as to at least partially alleviate or eliminate Ghost Mura. Besides, with such a display substrate and a manufacturing method thereof, a liquid crystal cell as well as a display, defects of an alignment film such as printing offset, edge unevenness and film thickness unevenness can all be avoided completely. Thereby image quality characteristics of a liquid crystal display device can be improved.

The embodiments of the present application provide a method for manufacturing a display substrate, comprising: coating all regions of a base substrate with an alignment film; performing a rubbing process on the base substrate coated with the alignment film; and removing the alignment film outside a display region of the base substrate by a photolithography process so as to retain only the alignment film in the display region.

According to this method, complete coating of an alignment film is performed on a manufactured base substrate, and then a rubbing process is performed. In this case, since what the friction cloth contacts is all alignment films, there is no electrostatic difference, and thereby Ghost Mura is effectively improved. Besides, defects of the alignment film such as printing offset, edge unevenness and film thickness unevenness can all be avoided. Therefore, the image quality characteristics of the liquid crystal display device are improved.

Specifically, the step of removing the alignment film outside a display region of the base substrate by a photolithography process so as to retain only the alignment film in the display region comprises: shielding the alignment film in the display region of the base substrate by a mask plate; and removing the alignment film outside the display region of the base substrate by an exposure process.

Specifically, the base substrate is an array substrate or a color filter substrate.

Specifically, the exposure process is performed by ultraviolet (UV) light.

Specifically, the UV light has a wavelength of 146 nm~365 nm.

Specifically, a distance between the mask plate and the base substrate is smaller than or equal to 50 μm.

Specifically, the method further comprises: performing a one-drop-fill (ODF) process of liquid crystal on the base substrate with the alignment film retained only in the display region.

The embodiments of the present application further provide a display substrate, which display substrate is manufactured by the method provided in the above embodiments of the present application.

Specifically, the display substrate is an array substrate or a color filter substrate.

The embodiments of the present application further provide a liquid crystal cell, comprising an array substrate and a color filter substrate, wherein at least one of the array substrate and the color filter substrate is manufactured by the method provided in the above embodiments of the present application.

The embodiments of the present application further provide a display, comprising the liquid crystal cell provided in the above embodiments of the present application.

DETAILED DESCRIPTION OF EMBODIMENTS

The embodiments of the present application provide a display substrate and a manufacturing method thereof, a liquid crystal cell as well as a display, so as to at least partially alleviate or eliminate Ghost Mura. Besides, with such a display substrate and a manufacturing method thereof, a liquid crystal cell as well as a display, defects of an alignment film such as printing offset, edge unevenness and film thickness unevenness can all be avoided completely. Thereby image quality characteristics of a liquid crystal display device can be improved.

Figure 1:
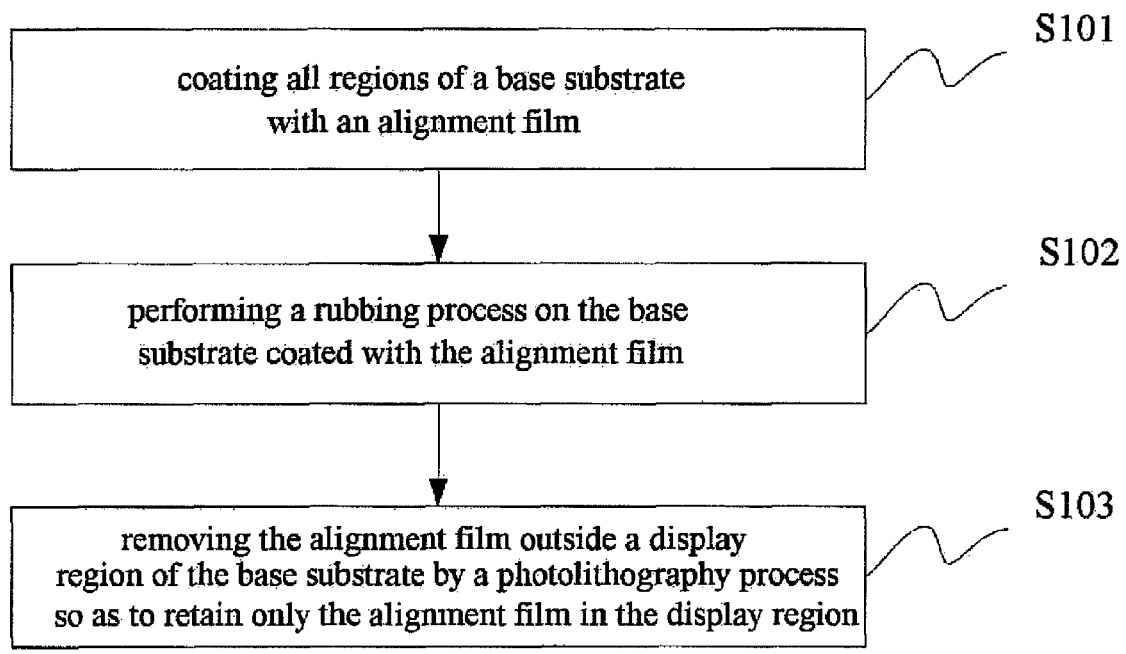
FIG. 1 is a schematic flow chart illustrating a method for manufacturing a display substrate as provided in the embodiments of the present application.

Referring to FIG. 1, the embodiments of the present application provide a method for manufacturing a display substrate comprising steps as follows. S101, coating all regions of a base substrate with an alignment film. It should be noted that before all regions are coated with the alignment film, conventional operations such as printing, pre-curing and main curing can also be performed on an alignment material to be used (e.g., polyimide PI). S102, performing a rubbing process on the base substrate coated with the alignment film. S103, removing the alignment film outside a display region of the base substrate by a photolithography process so as to retain only the alignment film in the display region.

Specifically, the above step S103 can comprise the following sub-steps: shielding the alignment film in the display region of the base substrate by a mask plate; and removing the alignment film outside the display region of the base substrate by an exposure process.

Specifically, the base substrate is an array substrate or a color filter substrate.

In other words, the method provided in the embodiments of the present application can be used for manufacturing both an array substrate and a color filter substrate.

Specifically, the exposure process is performed by ultra-violet UV light.

In addition, specifically, the mask plate to be used should also ensure that the alignment material (e.g., polyimide PI) and a sealant do not overlay each other.

Specifically, the UV light has a wavelength of 146 nm~365 nm. Of course, it can also have other wavelengths.

Specifically, a distance between the mask plate and the base substrate is smaller than or equal to 50 µm.

Specifically, the method further comprises: performing a one-drop-fill process of liquid crystal on the base substrate with the alignment film retained only in the display region.

Figure 2:
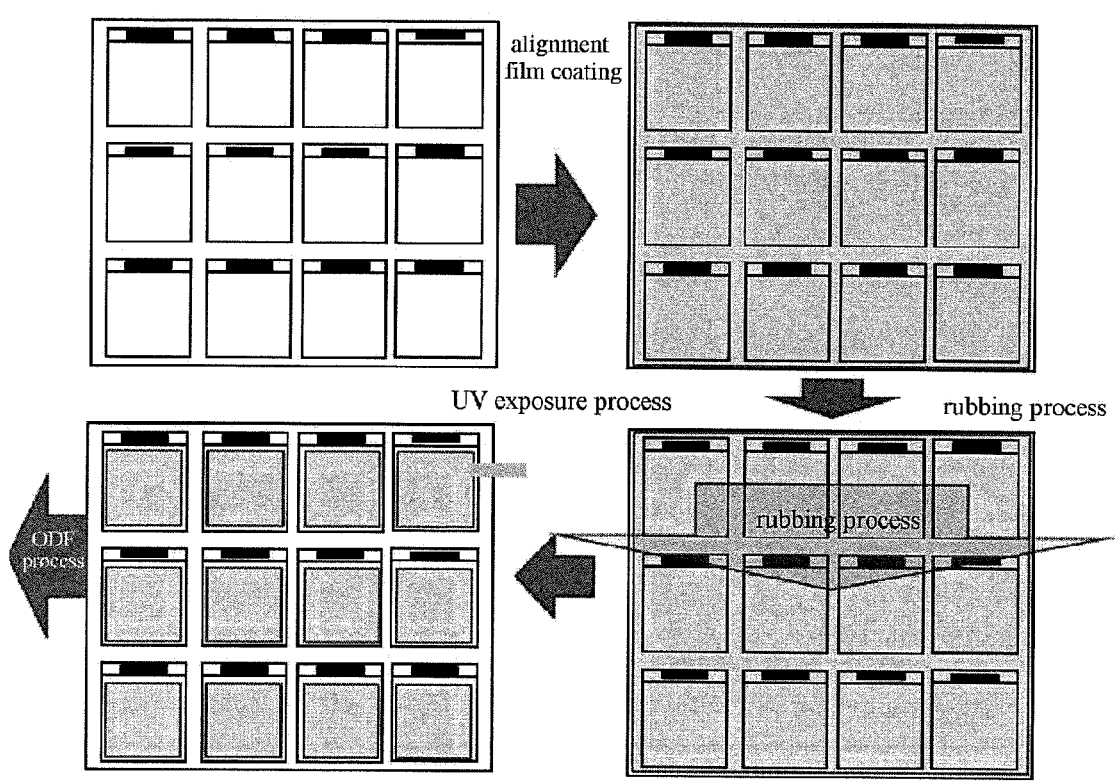
FIG. 2 is a schematic principle view illustrating a method for manufacturing a display substrate as provided in the embodiments of the present application.

The embodiments of the present application provide a new substrate manufacturing process so as to achieve normal binding lines while improving Ghost Mura. Referring to FIG. 2, complete coating of an alignment film is performed on an array substrate and a color filter substrate which have already been manufactured (the alignment film for coating is indicated by a grey shadow in FIG. 2), and then a rubbing process is performed. In this case, there is no electrostatic difference since what the friction cloth contacts is all alignment films, and thereby Ghost Mura is effectively improved. After the rubbing process is accomplished, the alignment film outside a display region of the base substrate is removed by a photolithography process, so as to retain only the alignment film in the display region. Specifically, the mask plate is arranged on the alignment film such that the mask plate shields the alignment film in the display region; the alignment film outside the display region of the substrate is removed by UV exposure; and then subsequent processes such as one-drop-fill are performed. In this way, Ghost Mura can be improved effectively, and defects of the alignment film such as printing offset, edge unevenness and film thickness unevenness can also be avoided. Thereby image quality characteristics of the liquid crystal display device are improved.

Figure 3:
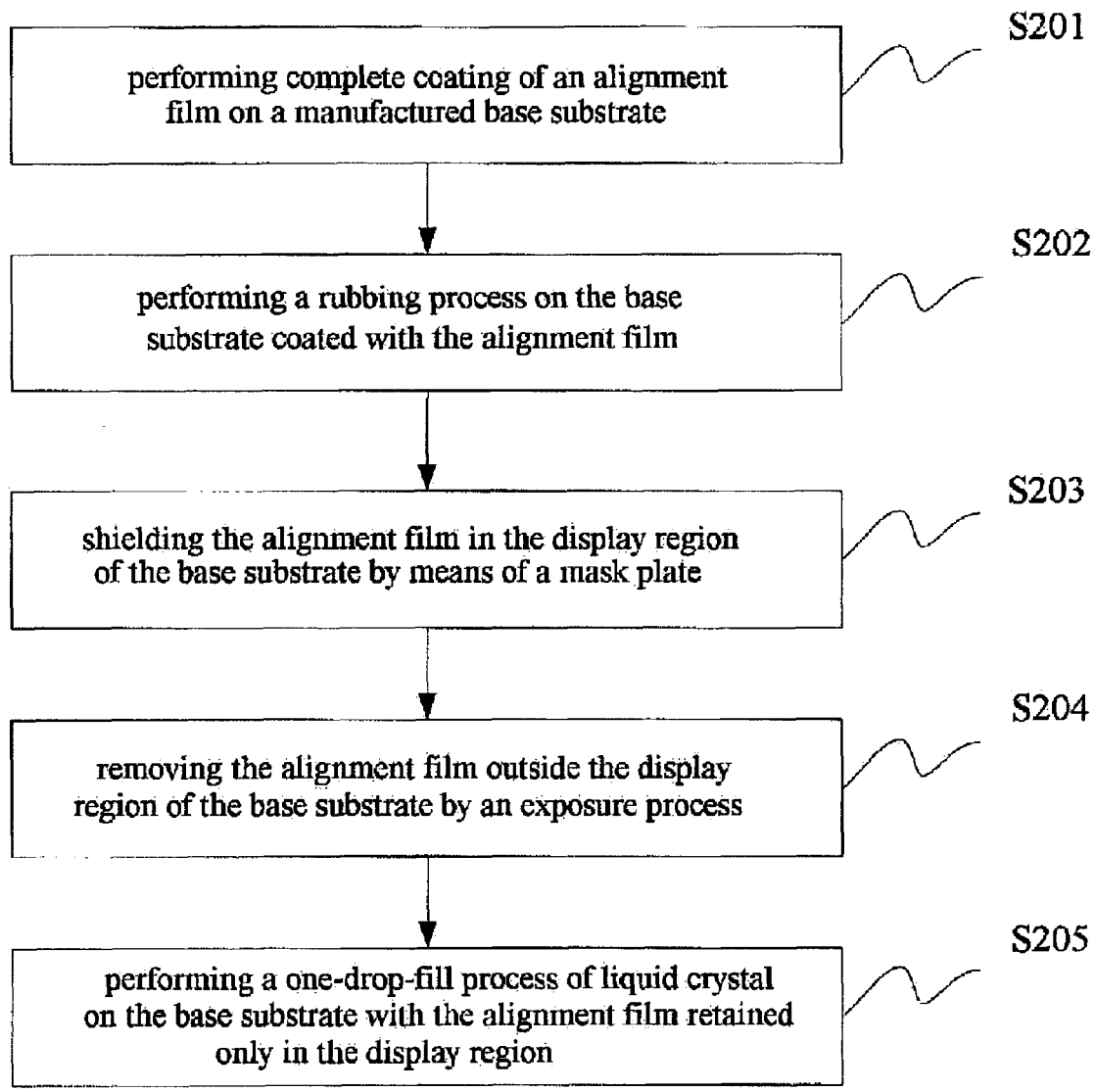
FIG. 3 is a schematic flow chart illustrating another method for manufacturing a display substrate as provided in the embodiments of the present application.
Figure 4:
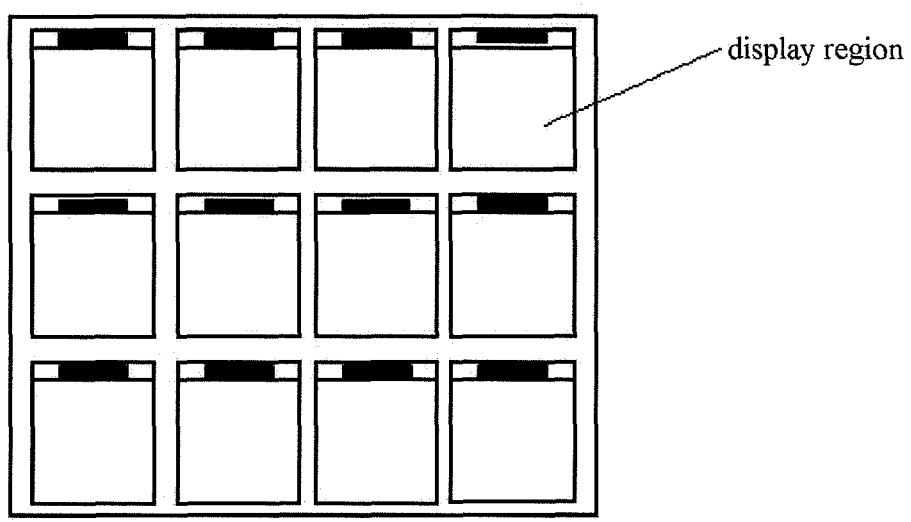
FIG. 4 is a schematic structural view of a base substrate comprising a plurality of rectangular display regions as provided in the embodiments of the present application.
Figure 5:
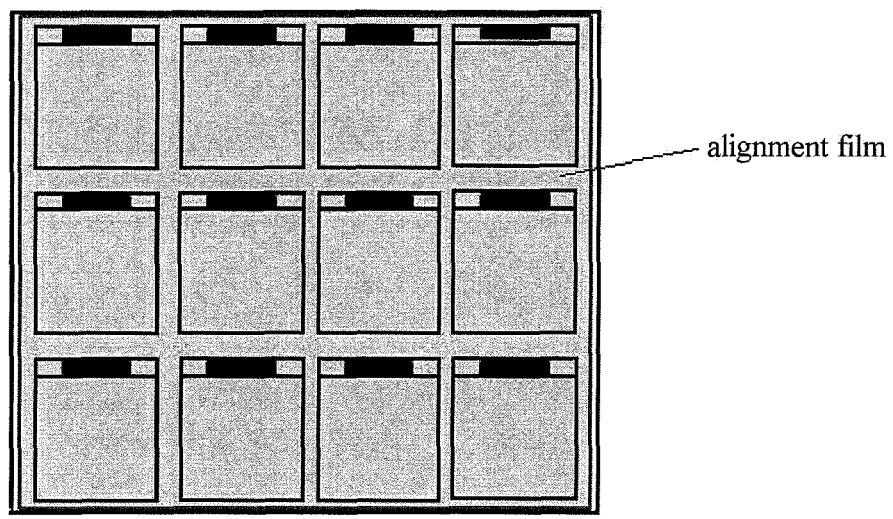
FIG. 5 is a schematic structural view of a base substrate after complete coating of an alignment film as provided in the embodiments of the present application.
Figure 6:
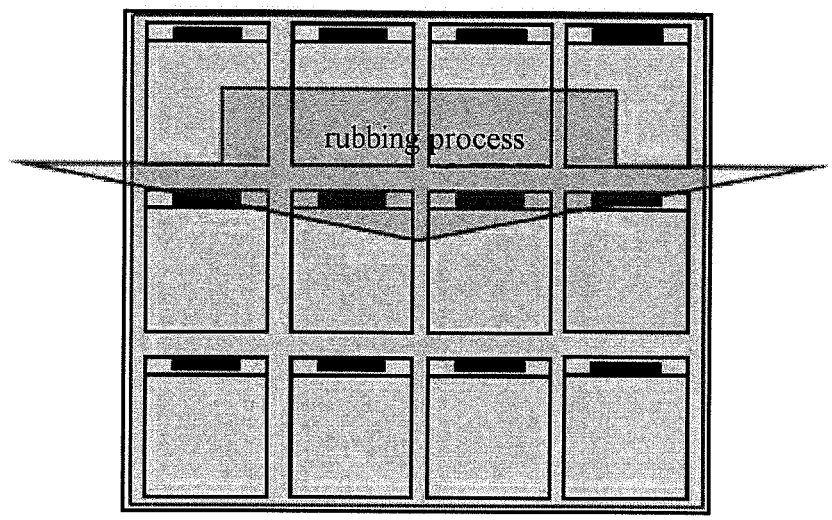
FIG. 6 is a schematic view for performing a rubbing process on a substrate coated with an alignment film as provided in the embodiments of the present application.

In other words, referring to FIG. 3, the method for manufacturing a display substrate as provided in the embodiments of the present application can comprise steps as follows. S201, performing complete coating of an alignment film on a manufactured base substrate. As shown in FIG. 4, the manufactured base substrate comprises a plurality of rectangular display regions. S202, performing a rubbing process on the base substrate coated with the alignment film. As shown in FIG. 5, the alignment film for coating is indicated by a grey shadow. FIG. 6 shows a procedure of performing a rubbing process on a substrate coated with an alignment film. S203, shielding the alignment film in the display region of the base substrate by a mask plate. S204, removing the alignment film outside the display region of the base substrate by an exposure process. S205, performing a one-drop-fill process of liquid crystal on the base substrate with the alignment film retained only in the display region.

Figure 7:
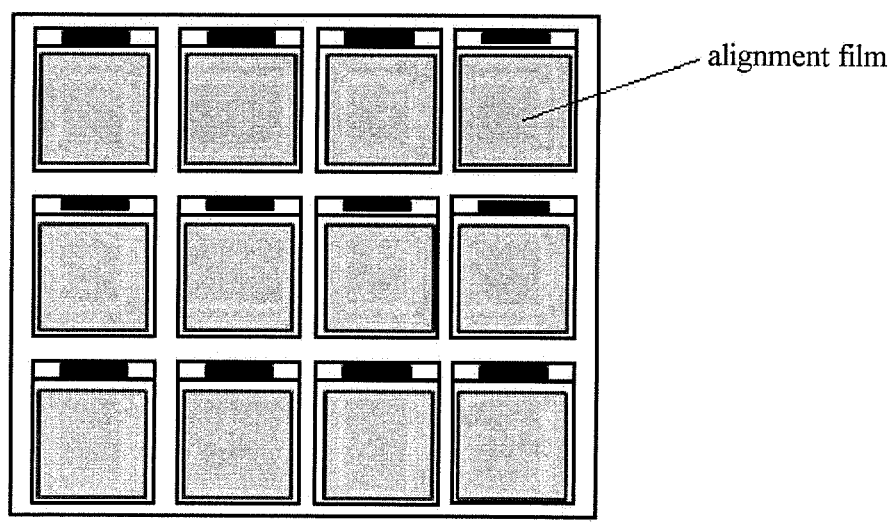
FIG. 7 is a schematic structural view of a base substrate with an alignment film retained only in the display region as provided in the embodiments of the present application.

Specifically, as shown in FIG. 7, the alignment film is retained in each display region.

The embodiments of the present application further provide a display substrate, which display substrate is manufactured by the method provided in the above embodiments of the present application.

Specifically, the display substrate is an array substrate or a color filter substrate.

The embodiments of the present application further provide a liquid crystal cell, comprising an array substrate and a color filter substrate, wherein at least one of the array substrate and the color filter substrate is manufactured by the method provided in the above embodiments of the present application.

The embodiments of the present application further provide a display, comprising the liquid crystal cell provided in the above embodiments of the present application.

To sum up, according to the embodiments of the present application, complete coating of an alignment film is performed on an array substrate and a color filter substrate which have already been manufactured, and then a rubbing process is performed. Since what the friction cloth contacts is all alignment films, there is no electrostatic difference, and thereby Ghost Mura is effectively improved. After the rubbing process is accomplished, the alignment film outside a display region of the base substrate is removed by a photolithography process so as to retain only the alignment film in the display region. Specifically, the mask plate is arranged on the alignment film such that the mask plate shields the alignment film in the display region; the alignment film outside the display region of the substrate is removed by UV exposure; and then subsequent processes such as one-drop-fill are performed. In this way, Ghost Mura can be improved effectively, and defects of the alignment film such as printing offset, edge unevenness and film thickness unevenness can also be avoided. Thereby image quality characteristics of the liquid crystal display device are improved.

Obviously, those skilled in the art can make various modifications and variations to the present application without deviating from the spirits and scopes of the present application. Thus if the modifications and variations to the present application fall within the scopes of the claims of the present application and the equivalent techniques thereof, the present application is intended to include them too.

The invention claimed is:

1. A method for manufacturing a display substrate, comprising:

coating all regions of a base substrate with an alignment film;

performing a rubbing process on the base substrate coated with the alignment film; and removing the alignment film outside a display region of the base substrate by a photolithography process so as to retain only the alignment film in the display region.

2. The method according to claim 1, wherein the step of removing the alignment film outside the display region of the base substrate by the photolithography process so as to retain only the alignment film in the display region comprises:

shielding the alignment film in the display region of the base substrate by a mask plate; and removing the alignment film outside the display region of the base substrate by an exposure process.

3. The method according to claim 1, wherein the base substrate is an array substrate or a color filter substrate.

4. The method according to claim 2, wherein the exposure process is performed by ultraviolet (UV) light.

5. The method according to claim 4, wherein the UV light has a wavelength of 146 nm~365 nm.

6. The method according to claim 2, wherein a distance between the mask plate and the base substrate is smaller than or equal to 50 μm.

7. The method according to claim 1, further comprising: performing a one-drop-fill process of liquid crystal on the base substrate with the alignment film retained only in the display region.

8. The method according to claim 7, wherein the step of removing the alignment film outside the display region of the base substrate by the photolithography process so as to retain only the alignment film in the display region comprises:

shielding the alignment film in the display region of the base substrate by a mask plate; and removing the alignment film outside the display region of the base substrate by an exposure process.

9. The method according to claim 7, wherein the base substrate is an array substrate or a color filter substrate.

10. The method according to claim 8, wherein the exposure process is performed by ultraviolet (UV) light.

11. The method according to claim 10, wherein the UV light has a wavelength of 146 nm~365 nm.

12. The method according to claim 8, wherein a distance between the mask plate and the base substrate is smaller than or equal to 50 μm.

13. A display substrate manufactured by the method according to claim 1.

14. The display substrate according to claim 13, wherein the display substrate is an array substrate or a color filter substrate.

15. A liquid crystal cell comprising an array substrate and a color filter substrate, wherein at least one of the array substrate and the color filter substrate is manufactured by the method according to claim 1.

16. A display comprising the liquid crystal cell according to claim 15.

* * * * *